United States Patent [19]

Cook et al.

[11] Patent Number: 4,847,719

[45] Date of Patent: Jul. 11, 1989

[54] APPARATUS AND METHOD FOR PROTECTING THE CONTACTS OF AN ELECTRICAL SWITCH FROM CURRENT SURGES

[76] Inventors: Max W. Cook, 845 2nd St., Northwest; Wade E. Moose, Rte. 13, Box 1163, both of Hickory, N.C. 28601; David C. Steele, 34 Ellenwood Rd., Granite Falls, N.C. 28630

[21] Appl. No.: 153,997

[22] Filed: Feb. 9, 1988

[51] Int. Cl.[4] ............................................. H02H 3/20
[52] U.S. Cl. ........................................ 361/13; 361/5; 361/6; 361/8; 361/11; 361/91; 361/93; 335/156; 340/547; 340/545
[58] Field of Search .................. 361/5, 6, 8, 9, 10, 361/11, 13, 91, 93; 335/153, 156, 205, 206, 207; 340/541, 545, 547

[56] References Cited

U.S. PATENT DOCUMENTS

| | | | |
|---|---|---|---|
| D. 253,106 | 10/1979 | Holce et al. | D13/32 |
| D. 255,030 | 5/1980 | Holce et al. | D13/32 |
| D. 262,618 | 1/1982 | Holce et al. | D13/22 |
| D. 268,669 | 4/1983 | Holce et al. | D13/38 |
| D. 272,242 | 1/1984 | Holce et al. | D13/40 |
| D. 273,783 | 5/1984 | Holce et al. | D13/40 |
| 3,600,634 | 8/1971 | Muench, Jr. | 361/111 X |
| 3,656,024 | 4/1972 | Davis | 361/111 X |
| 3,736,467 | 5/1973 | Meier et al. | 361/5 |
| 3,868,549 | 2/1975 | Schaefer et al. | 361/13 |
| 4,209,814 | 6/1980 | Garzon | 361/5 |
| 4,210,888 | 7/1980 | Holce | 335/207 |
| 4,213,110 | 7/1980 | Holce | 335/207 |
| 4,300,181 | 11/1981 | Premerlani | 361/13 X |
| 4,310,835 | 1/1982 | Seffon | 340/545 X |
| 4,335,270 | 6/1982 | Holce et al. | 335/202 |
| 4,371,856 | 2/1983 | Holce et al. | 335/202 |
| 4,409,577 | 10/1983 | Holce et al. | 335/202 |
| 4,438,430 | 3/1984 | Young et al. | 340/547 |
| 4,571,656 | 2/1986 | Ruckman | 361/56 |
| 4,587,588 | 5/1986 | Goldstein | 361/54 |
| 4,628,394 | 12/1986 | Crosby et al. | 361/111 X |

*Primary Examiner*—Derek S. Jennings
*Attorney, Agent, or Firm*—Bell, Seltzer, Park & Gibson

[57] ABSTRACT

The contacts of an electrical switch, such as a magnetic contact reed switch or a magnetic contact reed relay used in a burglar alarm system, are protected from being fused together by transient current surges. This protection is accomplished by providing a normally nonconductive shunting path in parallel with the switch. The shunting path includes a voltage responsive device which is biased to conduction in response to a current surge to thereby complete the shunting path and allow the current surge to bypass the switch.

19 Claims, 1 Drawing Sheet

APPARATUS AND METHOD FOR PROTECTING THE CONTACTS OF AN ELECTRICAL SWITCH FROM CURRENT SURGES

FIELD AND BACKGROUND OF THE INVENTION

This invention relates generally to protecting the contacts of an electrical switch from a current surge condition, and more particularly relates to a switch which is protected against the welding or fusing together of its contacts in the event of a current surge condition.

Transient current surges and/or voltage spikes in electrical power distribution systems can occur as a result of lightning storms or other abnormal conditions in an electrical power distribution system. These surges or transients can disrupt or permanently damage electrical devices connected to the power distribution system. It is well recognized, for example, that computers are quite sensitive to power surges or transients, and various power conditioning devices or filters are available commercially to protect computers and other sensitive electronic equipment from such abnormal power conditions.

It has been overlooked, however, by many people that electrical devices which rely upon switches or relays, especially minaturized switches or relays, are also quite susceptible to disruption or damage by abnormal current surges or transients. These surges or transients can cause the contacts of the switch or relay to become permanently fused together.

The fusing of switch contacts due to current surges is a significant problem, especially in burglar alarm systems, which utilize many such switches to monitor the opening of windows and doors and to monitor the activating of motion detectors, smoke/fire detectors, and other protective monitoring devices. Once the contacts of one of these switches are fused together, the switch will not thereafter respond to the respective door opening, window opening, or other activating condition. This is troublesome in a burglar alarm system because the fused switch does not give the proper indication of its status to the user. Moreover, the existence of a fused switch is not readily apparent to the user since the burglar alarm system appears to be operating in the normal manner.

For example, a typical burglar alarm switch uses a tiny magnetic contact reed switch for monitoring the doors and windows. The magnetic contact reed switch normally operates by its contacts being maintained in a closed position when an external permanent magnet is located nearby. When the permanent magnet is moved away from the switch, as would occur when the door or window is opened, the contacts open so as to cause an open-circuit condition in the monitoring loop of the burglar alarm system. If the burglar alarm system is in the operational mode so that a monitoring control station recognizes this open-circuit condition, an alarm condition occurs.

However, a transient current surge condition, such as may occur during a lightning storm, may disrupt this normal operation mode. When a current surge occurs on the monitoring loop due to a transient on the power input line, this current surge may fuse the contacts of the magnetic contact reed switch together. Consequently, after such fusing, when a door or window is opened, the contacts remain in a closed position instead of being in an open-circuit condition. The monitoring control station recognizes the monitoring loop as still being completed or, in other words, that the door or window is still closed when it actually is not.

Unless each switch device in the monitoring system is individually tested, the user will not ordinarily know that any of the switches are fused, since they are contained in a compact housing and cannot be easily inspected. As a result, the user will believe that the burglar alarm system is operating properly, when in fact, those windows or doors having fused switch contacts will no longer be protected by the alarm system. Similar problems are presented with other types of monitoring devices which use small contact switches, or magnetic contact reed relays such as smoke/fire detectors, motion detectors, and the like.

With the foregoing in mind, it is a primary object of the present invention to provide an improved electrical switch apparatus in which the switch contacts thereof are protected from fusing caused by current surges.

It is a further and more specific object of the present invention to provide an improved electrical switch apparatus which will indicate when the switch is no longer operable so as not to give the user a false sense of security about the operability of the switch.

SUMMARY OF THE INVENTION

These and other objects and advantages of the present invention are achieved by the electrical switch apparatus and method hereinafter more fully described.

The electrical switch apparatus of the present invention includes a pair of terminals or leads with a switching circuit and a shunting circuit connected between the leads. The switching circuit includes a biasing resistor and a switch respectively connected in series with each other between the leads. The switch has contacts which are movable between a closed position for completing a circuit and an open position for interrupting the circuit. The shunting circuit includes a normally nonconductive current shunting means connected in parallel with the switching circuit between the pair of leads. In normal operation, the current shunting means maintains the shunting circuit at a substantially higher impedance (i.e. nonconductive or open-circuited) than the normal operating impedance of the switching circuit. If the contacts of the switch are in a closed position, this normal operating impedance in the switching circuit allows normal operating current to flow between the leads. The current shunting means becomes conductive in response to the application of a predetermined voltage. The biasing resistor cooperates with the current shunting means so as to bias the current shunting means to conduction in response to the presence of a current surge in the switching circuit. A low impedance path is thereby formed in the shunting circuit for allowing the current surge to flow through the current shunting means so as to shunt or bypass the switch. This bypassing protects the contacts of the switch from fusing due to current surges.

In accordance with one aspect of the present invention, a fuse means is also connected in series with the switch and the biasing resistor of the switching circuit. The current shunting means (the shunting path) is connected in parallel with the biasing resistor and the switch. The fuse means is selected in relation to the total energy dissipation characteristics of the current shunting means, biasing resistor, and switch so that if these devices are subjected to a current surge approaching or equal to their failure point, the fuse means will responsively open-circuit. Thus, the impedance of the electrical switch apparatus changes from the normal operating impedance to an open-circuit impedance. This ensures that if these devices are about to fail, the switch apparatus will give an open-circuit indication, which can be readily detected and corrected. As a result, a false closed-circuit indication is avoided, which as noted earlier is difficult to detect and gives the user a false sense of security.

In accordance with another aspect of the present invention, a signalling resistor may be connected in series with the current shunting means of the shunting circuit. Additionally, the signalling resistor is connected in parallel with the fuse means. The signalling resistor is selected at a relatively high impedance, less than the impedance of an open circuit but greater than the normal operating impedance of the switch apparatus in the closed state. In this embodiment, when the fuse means open-circuits, the signalling resistor changes the impedance of the electrical switch apparatus from the normal operating impedance to a higher impedance. An appropriate circuit in the monitoring control station can distinguish this higher impedance from an open-circuit alarm condition and generate a signal that a fuse means in the monitoring loop is inoperable and requires replacing.

The present invention, in still another aspect, provides a method of protecting the contacts of the switch from fusing due to current surges which comprises providing a normally open-circuited shunting path around the switch while continuously sensing the voltage on a line connected to the switch. In response to the sensed voltage reaching a predetermined level, the shunting path is completed around the switch to thereby allow current surges to flow through the shunting path and to bypass the switch.

BRIEF DESCRIPTION OF THE DRAWINGS

Some of the features and advantages of the invention having been stated, other will appear as the description proceeds, when taken in connection with the accompanying drawings, in which.

DETAILED DESCRIPTION OF THE INVENTION

While the present invention will be described hereinafter with particular reference to the accompanying drawings, it is to be understood at the outset of this description that persons skilled in the applicable arts will be able to modify the specific arrangements here described and shown while continuing to achieve the desired result of this invention. Accordingly, the description and illustrations are to be taken as broad, teaching disclosures directed to persons skilled in the appropriate arts, and not as restricting the scope of the present invention.

Figure 1:
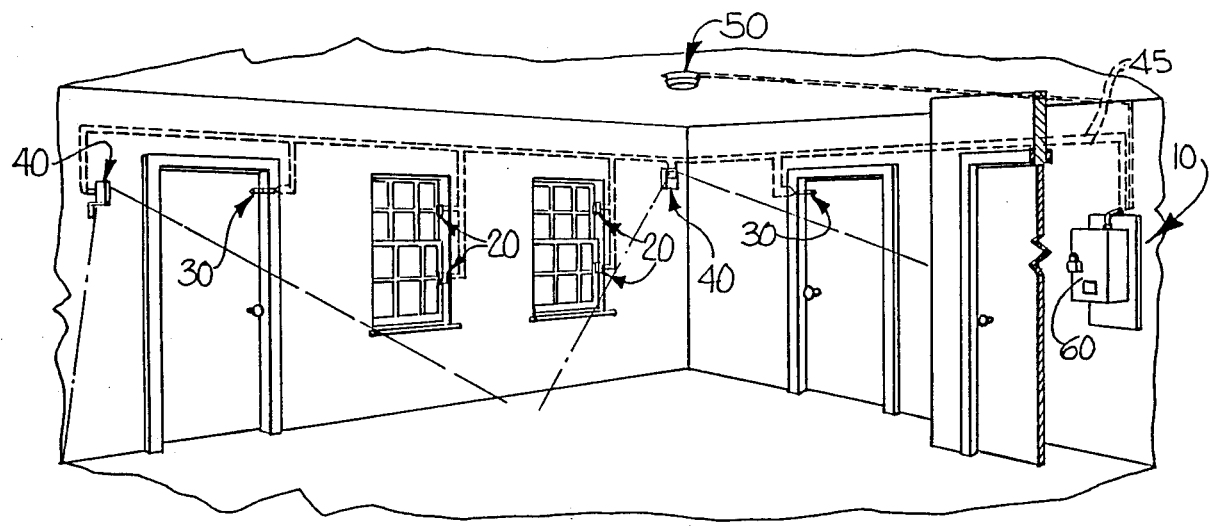
FIG. 1 is a perspective view showing a burglar alarm system in a typical room, with magnetic contact reed switches used at the doors and windows, and with magnetic contact reed relays used in the smoke/fire detectors and motion detectors.

FIG. 1 illustrates a typical installation of a burglar alarm system 10 in a room. As illustrated, surface mounted magnetic proximity switches 20 are mounted at the windows for detecting when the windows are opened, and recessed mounted magnetic proximity switches 30 are mounted in the doors for detecting when the doors are opened. In addition, motion detectors 50, of the known passive infrared type, are mounted on the walls for detecting an intrusion into the room. The switches 20, 30 and the motion detectors 40 are electrically connected in series to form a monitoring loop 45 which, in turn, is connected to a monitoring control station 60. The monitoring control station 60 may be of the type conventionally used in burglar alarm systems. Suitable monitoring control stations are available commercially, for example, from Moose Products, Inc. of Hickory, N.C. The loop 45 forms a complete, closed circuit when all of the doors and windows are closed and when there is no movement within the field of view of the motion detectors 40. However, an opening of one of the doors or windows would cause the respective switch associated therewith to open-circuit, which would be detected by the monitoring control station 60 as an alarm condition. Similarly, any movement within the room which is detected by the motion detectors 40 would cause the relay in the motion detector 40 to open-circuit. Also, as shown in FIG. 1, a smoke/fire detector 50 is mounted to the ceiling of the room and is electrically connected to the monitoring control station 60 in a conventional manner such that any smoke or fire conditions detected by the detector 50 would cause an appropriate alarm signal to be generated by the monitoring control station 60. Persons familiar with burglar alarm systems will recognize that the arrangement shown in FIG. 1 is illustrative, and that there are many other kinds of monitoring devices and other wiring arrangements which can be utilized in a burglar alarm system, depending upon the specific requirements of a particular installation.

All such burglar alarm systems rely heavily upon the use of miniature switches and relays, such as magnetic contact reed switches and magnetic contact reed relays. The switches or relays can either be of the normally open type, with the switch contacts being moved magnetically or mechanically to a closed condition, or they can be of the normally closed type, with the switch contacts being moved mechanically or magnetically to an open-circuit position. In either type, the fusing of the switch contacts would give an incorrect indication, and would render the switch inoperative for its intended function.

In the particular arrangement illustrated herein, the magnetic proximity switches 20, 30 use magnetic contact reed switches while the motion detectors 40 and smoke/fire detector 50 use magnetic contact reed relays. Both the magnetic contact reed switch and magnetic contact reed relay have contacts or reeds which are normally in an open position. In a magnetic contact reed switch, an external permanent magnet maintains the contacts in a closed position as is described more fully in FIGS. 2 and 3. The magnetic contact reed relay uses an electromagnet to close and open-circuit its contacts. While magnetic contact reed switches and magnetic contact reed relays are specifically discussed herein, it will be recognized that the present invention is applicable to any type of switch having movable contacts that close for completing a circuit and open for interrupting the circuit.

Figure 2:
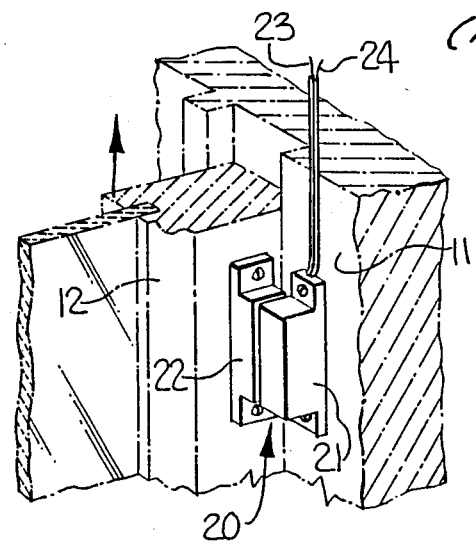
FIG. 2 is a perspective view of a surface mounted magnetic contact reed switch positioned on a window for use in the burglar alarm system of FIG. 1.

Referring now more particularly to FIG. 2, the surface mounted magnetic proximity switch 20 includes a magnetic contact switch portion 21 and an external permanent magnet portion 22. The switch portion 21 is mounted in a stationary position on a window jamb 11. The magnet portion 22 is mounted on a movable window sash 12. The switch portion 21 includes a hollow housing, within which is contained the magnetic contact reed switch and other current surge protective components to be described more fully below. When the magnet portion 22 is positioned proximate to switch portion 21 (by the window being closed), the contacts are moved to a closed position so that normal operating current can flow through first lead 23 and second lead 24. When the window opens so that the magnet portion 22 is moved away from the switch portion 21 the contacts open-circuit and interrupt this current flow.

Figure 3:
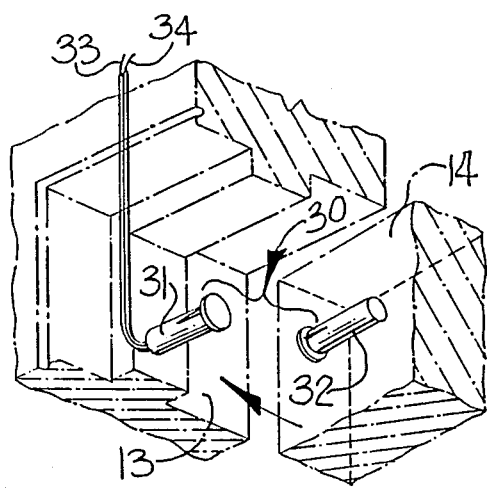
FIG. 3 is a perspective view of a recess mounted magnetic contact reed switch positioned in a door for use in the burglar alarm system of FIG. 1.

Turning to FIG. 3, the recess mounted magnetic proximity switch 30, comprises a magnetic contact switch portion 31, which is stationarily mounted in the door jamb 13, and an external permanent magnet portion 32 which is mounted in the movable door 14. The switch portion 31 has a hollow housing containing the magnetic contact reed switch and the other current surge protective components, and includes a first lead 33 and a second lead 34. When the magnet portion 32 is in a proximate relationship with the switch portion 31 (by the door being closed), the contacts are closed. When the door opens, the magnet portion 32 moves away from the switch portion 31 and the contacts open.

Figure 4:
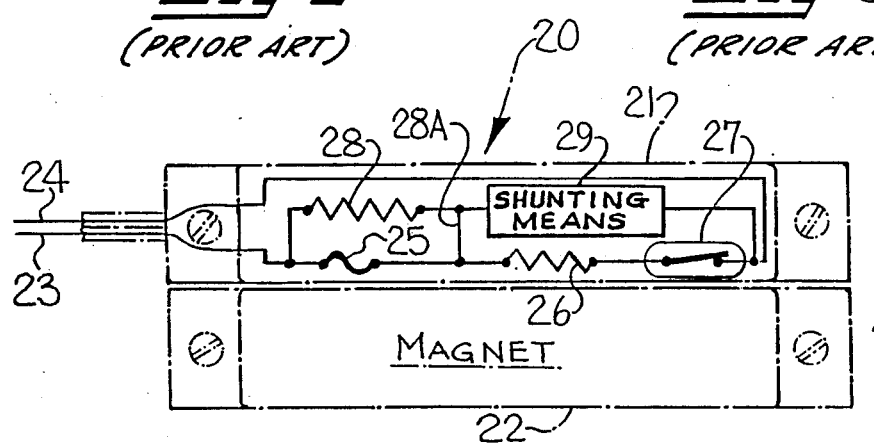
FIG. 4 is a schematic diagram of an electrical switch apparatus in accordance with the present invention.

The operative components of the current surge protected switch apparatus of the present invention are shown in the schematic diagram of FIG. 4. While the following detailed description discusses these components as applied to the surface mounted magnetic proximity switch 20, it will be readily understood by persons skilled in the art how to use this invention with other types of switches and relays having contacts movable between a closed position for completing a circuit and an open position for interrupting the circuit.

The switch portion 21 includes a switching circuit connected in series between the first and second leads 23, 24 and a shunting circuit connected in parallel with the switching circuit between the leads 23, 24. The switching circuit comprises a fuse means 25, a biasing resistor 26 and a magnetic contact reed switch 27 respectively connected in series with each other. The shunting circuit comprises a signalling resistor 28 and a normally nonconductive current shunting means 29 respectively connected in series with each other. Additionally, the signalling resistor 28 is connected in parallel with the fuse means 25 of the switching circuit by a branch 28A.

The current shunting means 29 is an avalanche-type device which in normal operation, is nonconductive (open-circuited) but which rapidly becomes conductive when a predetermined voltage is applied to it. The biasing resistor 26 senses for this predetermined voltage which will make the current shunting means 29 conductive. The biasing resistor 26 is selected at a value such that when normal operating current is applied across it, the current shunting means 29 is nonconductive. However, this selected value for the biasing resistor 26 causes a voltage to be applied to the current shunting means 29, which increases in response to increased current flow, and which thereby causes the current shunting means 29 to become conductive if a predetermined amount of current flow occurs. Therefore, the value of the biasing resistor 26 is also selected in relation to the current rating of the reed switch 27 so that the current shunting means 29 will become conductive before the current-carrying capacity of the reed switch 27 is exceeded. For example, in burglar alarm applications, the biasing resistor 26 may be typically selected in a range from five to twenty-five ohms and the predetermined voltage to make the current shunting means 29 conductive may be about fourteen (14v) volts.

Thus, in operation, under normal conditions, when the magnet portion 22 is cooperating with the switch portion 21 to hold the contacts of reed switch 27 closed, a current path is formed in the switching circuit between leads 23, 24. Upon the presence of a current surge in the switching circuit (i.e. leads 23, 24), such as may occur during lightning storms, the biasing resistor 26 causes an increase in the voltage applied to the current shunting means 29. When the predetermined voltage is reached, the current shunting means 29 avalanches into conduction by its inherent voltage breakdown characteristics. Consequently, a lower impedance path in the current shunting means 29 is formed than in the normal operating impedance path of the switching circuit. As a result, the current surge flows through the current shunting means 29 and not across the biasing resistor 26 and the reed switch 27. It is by this shunting path that the contacts of reed switch 27 are protected from fusing caused by current surges.

The current shunting means 29 can consist of known conductive/nonconductive devices as used in the industry, such as for example a metal oxide varistor ("MOV"), a pair of back-to-back zener diodes, a transorb, a gas discharge tube, a transient voltage protector ("TVP"), or other similar devices with these conductive/nonconductive transient surge suppressor characteristics.

The current shunting means 29 is subject to failure after encountering a number of current surges. The current shunting means 29 can fail either in the conductive or nonconductive (open-circuit) mode. If the current shunting means 29 should fail in the conductive mode, current surges will continue to bypass reed switch 27 and the switch portion 21 would remain permanently in the closed loop condition. On the other hand, if the current shunting means 29 should fail in the nonconductive mode, then it is no longer functional and the contacts of the reed switch 27 would be thereafter susceptible to fusing. In either event, the possibility exists for the switch 20 to fail to respond properly to the movement of the magnet portion 22 away from the switch portion 21. This improper indication on the status of switch 20 does not allow the monitoring control station 60 to recognize an alarm condition. Moreover, as noted earlier, the user cannot readily learn of this failed current shunting means 29 so that repairs can be made because the burglar alarm system 10 would appear to be operating properly.

To avoid this possibility, the present invention provides a fuse means 25 to be connected in the switching circuit. The fuse means 25 can be a fuse, a pair of diodes connected in series with each other, a gate of a transistor, or other similar fuse devices. The rating of the fuse means 25 is selected in relation to the total energy dissipation characteristics of the current shunting means 29, the biasing resistor 26, and the reed switch 27. Therefore, in operation, the fuse means 25 will open-circuit the switch portion 21 before the current shunting means 29, the biasing resistor 26, or the reed switch 27 will fail.

If the monitoring control station 60 can recognize a normal operation closed loop and an open-circuited loop indicative of an alarm condition, the open-circuit caused by the fuse means 25 will alert the user that the fuse means 25 is inoperable. This alerting is accomplished by an alarm condition going into effect if the failure occurs while the alarm system 10 is armed, or by an indication of a bad status condition if the failure occurs while the alarm system 10 is not armed, due to the system 10 recognizing that the monitoring loop 45 is open-circuited. This indication allows the burglar alarm system 10 to be appropriately repaired by replacing the defective devices. In the magnetic contact reed switch and the magnetic contact reed relay, the fuse means 25 and the current shunting means 29 are of such a small size and are of such a low cost that the defective switch portion 21 can be replaced as a whole.

The present invention provides an additional optional feature of providing a signalling resistor 28 selected at a high impedance in the shunting circuit. For example, in a burglar alarm application such as that illustrated herein, the signalling resistor 28 may be on the order of ten thousand ohms. In operation, when fuse means 25 open circuits, the current surge or normal operating current will flow across the signalling resistor 28. This current flow changes the impedance of switch portion 21 to a higher value than the normal operating impedance but to a lower value than the open-circuited impedance.

Therefore, if the monitoring control station 60 can recognize three states of operation, namely a normal operation closed loop, an open-circuited loop indicative of an alarm condition, and a high impedance loop indicative of a defective switch portion 21, the monitoring control station 60 will distinctly recognize this high impedance on the loop and indicate that the fuse means 25 is inoperable. On the other hand, if the monitoring control station 60 can only recognize a normal operation closed loop and an open-circuited loop indicative of an alarm condition, as is conventional with many commercially available monitoring control stations 60, the high impedance caused by the current flowing across the signalling resistor 28 will appear as an open-circuited loop to the monitoring control station 60 as discussed previously.

The present invention thus effectively protects the contacts of the reed switch 27 from fusing or welding caused by current surges. As a result, no false indications are given to the monitoring control station 60 about the status of switch portion 21. Additionally, this invention is capable of signalling the monitoring control station 60 when there is an open-circuited fuse means 25. Accordingly, users are not given a false sense of security about the status of their switches 20. In the drawings and specification, there have been set forth preferred embodiments of the invention, and although specific terms are employed, they are used in a generic and descriptive sense only and not for purposes of limitation, the scope of the invention being set forth in the following claims.

That which I claim is:

1. An electrical switch apparatus characterized by having its switch contacts protected against current surges, comprising:
   first and second leads;
   a switching circuit connected between said first and second leads and including a biasing resistor and a switch means respectively connected in series with each other between said first and second leads, said switch means having switch contacts movable between a closed position for completing a circuit and an open position for interrupting the circuit; and
   a shunting circuit connected in parallel with said switching circuit between said first and second leads and including a normally nonconductive current shunting means for normally maintaining a relatively high impedance in said shunting circuit which is greater than the impedance of said switching circuit so that current normally flows through said switching circuit, said normally nonconductive current shunting means becoming conductive in response to the application of a predetermined voltage, said biasing resistor cooperating with said current shunting means so as to bias said current shunting means to conduction in response to the presence of a current surge in said switching circuit to thus form a low impedance path in said shunting circuit and allow the current surge to flow through said current shunting means and bypass said switch means, thereby protecting said switch means from current surges.

2. The apparatus according to claim 1 wherein said switch means comprises a magnetic contact switch and a magnet cooperating with said magnetic contact switch to maintain the magnetic contact switch in a closed position when said magnet is positioned in a proximate relation to said magnetic contact switch.

3. The apparatus according to claim 2 wherein said magnetic contact switch comprises a magnetic reed switch and said magnet comprises a permanent magnet.

4. The apparatus according to claim 2 wherein said magnetic contact switch comprises a magnetic reed relay and said magnet comprises an electromagnet.

5. The apparatus according to claim 1 wherein said normally nonconductive current shunting means comprises a device selected from the group consisting of a metal oxide varistor, a gas discharge tube, a transorb, a transient voltage protector, and a pair of back-to-back oriented zener diodes.

6. The apparatus according to claim 1 wherein said switching circuit further includes a fuse means also connected in series with said biasing resistor and said switch means; said fuse means having a value selected in relation to the total energy dissipation characteristics of said current shunting means, said biasing resistor, and said switch means such that said fuse means will open-circuit before one of these devices fails.

7. The apparatus according to claim 6 wherein said shunting circuit further includes a signalling resistor having one end connected to said first lead and an opposite end connected to said current shunting means, and means electrically connecting said opposite end of said signalling resistor to said opposite end of said fuse means so that the signalling resistor is connected in parallel with said fuse means said signalling resistor having a high impedance such that if said fuse means open-circuits, the signalling resistor will change the impedance of said switch apparatus to a higher value than the normal operating impedance but to a lower value than the open-circuited impedance to signal that said fuse means is inoperable.

8. An electrical switch apparatus characterized by having its switch contacts protected against current surges, comprising:

first and second leads;

a switching circuit connected between said first and second leads and including a fuse means, a biasing resistor, and a magnetic contact switch respectively connected in series with each other between said first and second leads, said magnetic contact switch having switch contacts movable between a closed position for completing a circuit and an open position for interrupting the circuit; and a shunting circuit connected in parallel with said switching circuit between said first and second leads and including a signalling resistor and a normally nonconductive current shunting means respectively connected in series between said first and second leads, said normally nonconductive current shunting means becoming conductive in response to the application of a predetermined voltage, and means connecting said signalling resistor in parallel with respect to said fuse means of said switching circuit, said shunting circuit normally maintaining a relatively high impedance which is greater than the impedance of said switching circuit so that current flows through said switching circuit, and said biasing resistor cooperating with said current shunting means so as to bias said current shunting means to conduction in response to the presence of a current surge in said switching circuit to thus form a low impedance path in said shunting circuit and allow the current surge to flow through said current shunting means and bypass said switch, thereby protecting said switch from current surges, said fuse means having a value selected in relation to the total energy dissipation characteristics of said current shunting means, said biasing resistor, and said switch such that the fuse means will open-circuit before one of these devices fails, and said signalling resistor being selected at a high impedance such that if said fuse means open-circuits, the signalling resistor will change the impedance of said switch apparatus to a higher value than the normal operating impedance but to a lower value than the open-circuited impedance for signalling that said fuse means is inoperable.

9. The apparatus according to claim 8 wherein said normally nonconductive current shunting means comprises a device selected from the group consisting of a metal oxide varistor, a gas discharge tube, a transorb, a transient voltage protector, and a pair of back-to-back oriented zener diodes.

10. An electrical switch apparatus characterized by having its switch contacts protected against current surges, comprising:

a housing having a first and second leads for connecting said switch apparatus to an electrical system;

a switching circuit located within said housing and connected between said first and second leads and including a biasing resistor and a magnetic contact switch respectively connected in series with each other between said first and second leads, said magnetic contact switch having switch contacts movable between a closed position for completing a circuit and an open position for interrupting the circuit; and a shunting circuit located within said housing and connected in parallel with said switching circuit between said first and second leads and including a normally nonconductive current shunting means for normally maintaining a relatively high impedance in said shunting circuit which is greater than the impedance of said switching circuit so that current normally flows through said switching circuit, said normally nonconductive current shunting means becoming conductive in response to the application of a predetermined voltage, said biasing resistor cooperating with said current shunting means so as to bias said current shunting means to conduction in response to the presence of a current surge in said switching circuit to thus form a low impedance path in said shunting circuit and allow the current surge to flow through said current shunting means and bypass said magnetic contact switch, thereby protecting said magnetic contact switch from current surges.

11. The apparatus according to claim 10 including a magnet cooperating with said magnetic contact switch to maintain the switch contacts in a closed position when said magnet is positioned in a proximate relation to said magnetic contact switch.

12. The apparatus according to claim 11 wherein said magnetic contact switch comprises a magnetic reed switch comprising a reed with magnetically movable switch contacts, and said magnet comprises a permanent magnet located externally of said housing adjacent to said reed.

13. The apparatus according to claim 11 wherein said magnetic contact switch comprises a magnetic reed relay comprising a reed with magnetically movable switch contacts, and said magnet comprises an electromagnet located internally of said housing adjacent to said reed.

14. A burglar alarm system comprising:

a monitoring control station; and a plurality of electrical switch devices respectively connected with said monitoring control station for allowing said monitoring control station, in normal operation, to recognize and to appropriately indicate an alarm condition in response to a change in the impedance of one or more of said switch devices;

each of said switch devices comprising:

a housing having a first and second leads electrically connected to said monitoring control station;

a switching circuit located within said housing and connected between said first and second leads and including a biasing resistor and a switch means respectively connected in series with each other between said first and second leads, said switch means having switch contacts movable between a closed position for completing a circuit and an open position for interrupting the circuit; and a shunting circuit located within said housing and connected in parallel with said switching circuit between said first and second leads and including a normally nonconductive current shunting means for normally maintaining a relatively high impedance in said shunting circuit which is greater than the impedance of said switching circuit so that current normally flows through said switching circuit, said normally nonconductive current shunting means becoming conductive in response to the application of a predetermined voltage, said biasing resistor cooperating with said current shunting means so as to bias said current shunting means to conduction in response to the presence of a current surge in said switching circuit to thus form a low impedance path in said shunting circuit and allow the current surge to flow through said current shunting means and bypass said switch means, thereby protecting said switch means from current surges.

15. The apparatus according to claim 14 wherein said normally nonconductive current shunting means comprises a device selected from the group consisting of a metal oxide varistor, a gas discharge tube, a transorb, a transient voltage protector, and a pair of back-to-back oriented zener diodes.

16. The apparatus according to claim 14 wherein said switching circuit further includes a fuse means also connected in series with said biasing resistor and said switch means said fuse means having a value selected in relation to the total energy dissipation characteristics of said current shunting means, said biasing resistor, and said switch means such that said fuse means will open-circuit before one of these devices fails.

17. A burglar alarm system comprising:
a monitoring control station; and
a monitoring loop comprising a plurality of electrical switch devices respectively connected in series with each other and with said monitoring control station for allowing said monitoring control station to recognize and to appropriately respond to a normal operation closed loop and an open-circuited loop indicative of an alarm condition;
each of said switch devices comprising:
a housing having a first and second leads electrically connected to the monitoring control station;
a switching circuit located within said housing and connected between said first and second leads, said switching circuit including a biasing resistor and a switch means respectively connected in series with each other between said first and second leads, said switch means having normally open switch contacts movable between a closed position for completing a circuit and an open position for interrupting the circuit, and means cooperating with the switch contacts to maintain the contacts in a closed position; and
a shunting circuit located within said housing and connected in parallel with said switching circuit between said first and second leads and including a normally nonconductive current shunting means for normally maintaining a relatively high impedance in said shunting circuit which is greater than the impedance of said switching circuit so that current normally flows through said switching circuit, said normally nonconductive current shunting means becoming conductive in response to the application of a predetermined voltage, and said biasing resistor cooperating with said current shunting means so as to bias said current shunting means to conduction in response to the presence of a current surge in said switching circuit to thus form a low impedance path in said shunting circuit and allow the current surge to flow through said current shunting means and bypass said switch means, thereby protecting said switch means from current surges.

18. The apparatus according to claim 17 wherein said switch means comprises a magnetic contact switch, and said means for maintaining the switch contacts in a closed position comprises a magnet cooperating with said magnetic contact switch to maintain the switch contacts in a closed position when said magnet is positioned proximate to said contact switch.

19. A burglar alarm system comprising:
a monitoring control station; and
a monitoring loop comprising a plurality of electrical switch devices respectively connected in series with each other and with said monitoring control station for allowing said monitoring control station to recognize and to appropriately respond to three conditions, namely a normal operation closed loop, an open-circuited loop indicative of an alarm condition, and a high impedance loop indicative of a failure of one of said electrical switch devices;
each of said switch devices comprising:
a housing having a first and second leads electrically connected to the monitoring loop;
a switching circuit located within said housing and connected between said first and second leads, said switching circuit including fuse means, a biasing resistor, and a switch means respectively connected in series with each other between said first and second leads, said switch means having switch contacts movable between a closed position for completing a circuit and an open position for interrupting the circuit; and
a shunting circuit located within said housing and connected in parallel with said switching circuit between said first and second leads, said shunting circuit including a signalling resistor and a normally nonconductive current shunting means respectively connected in series between said first and second leads, said normally nonconductive current shunting means becoming conductive in response to the application of a predetermined voltage, and means connecting said signalling resistor in parallel with respect to said fuse means of said switching circuit, said shunting circuit normally maintaining a relatively high impedance which is greater than the impedance of said switching circuit so that current normally flows through said switching circuit, and said biasing resistor cooperating with said current shunting means so as to bias said current shunting means to conduction in response to the presence of a current surge in said switching circuit to thus form a low impedance path in said shunting circuit and allow the current surge to flow through said current shunting means and bypass said switch means, thereby protecting said switch means from current surges, said fuse means having a value selected in relation to the total energy dissipation characteristics of said current shunting means, said biasing resistor, and said switch means such that the fuse means will open-circuit before one of these devices fails, and said signalling resistor being selected at a high impedance such that if said fuse means open-circuits, the signalling resistor will change the impedance of said switch device to a higher value than the normal operating impedance but to lower value than the open-circuit impedance for signalling that said fuse means is inoperable.

* * * * *